Jan. 29, 1929. 1,700,598
F. H. ROYCE
STEERING MECHANISM FOR SELF PROPELLED VEHICLES
Filed March 11, 1927   2 Sheets-Sheet 2
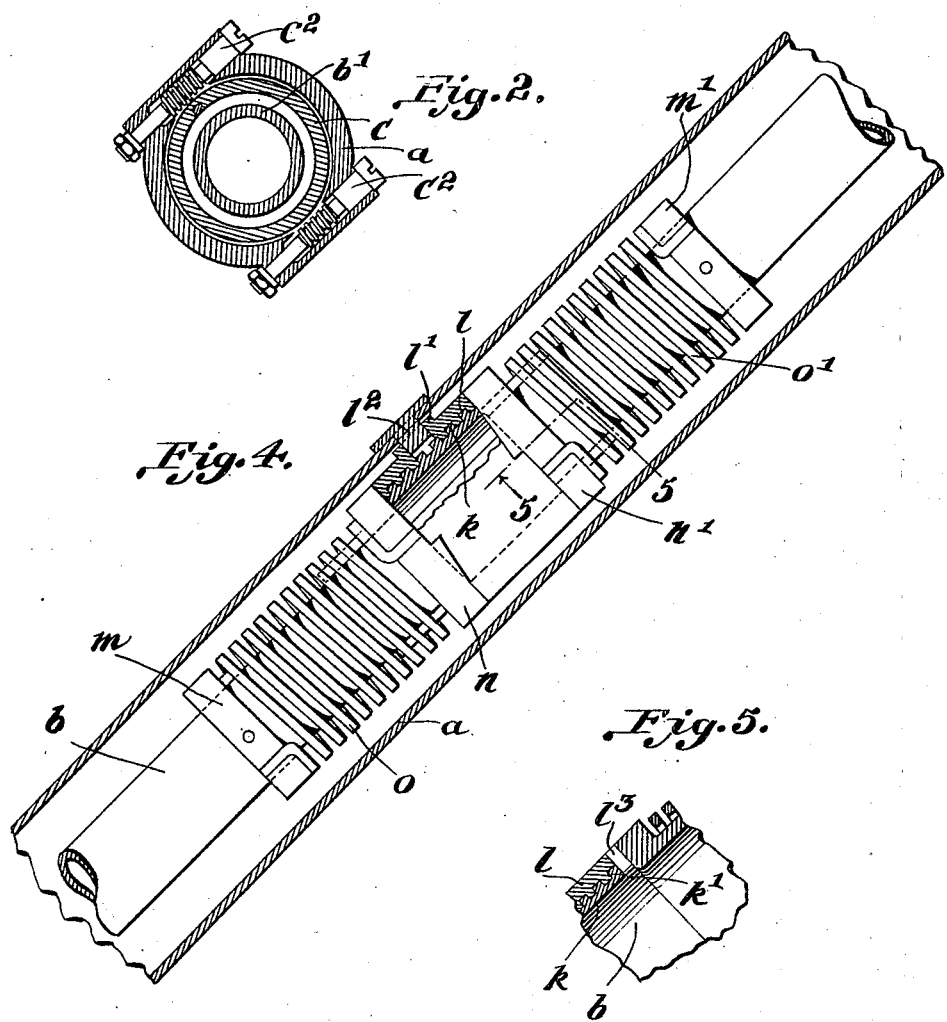
Inventor
Frederick Henry Royce
By Mason Fenwick & Lawrence
Attorneys Patented Jan. 29, 1929.

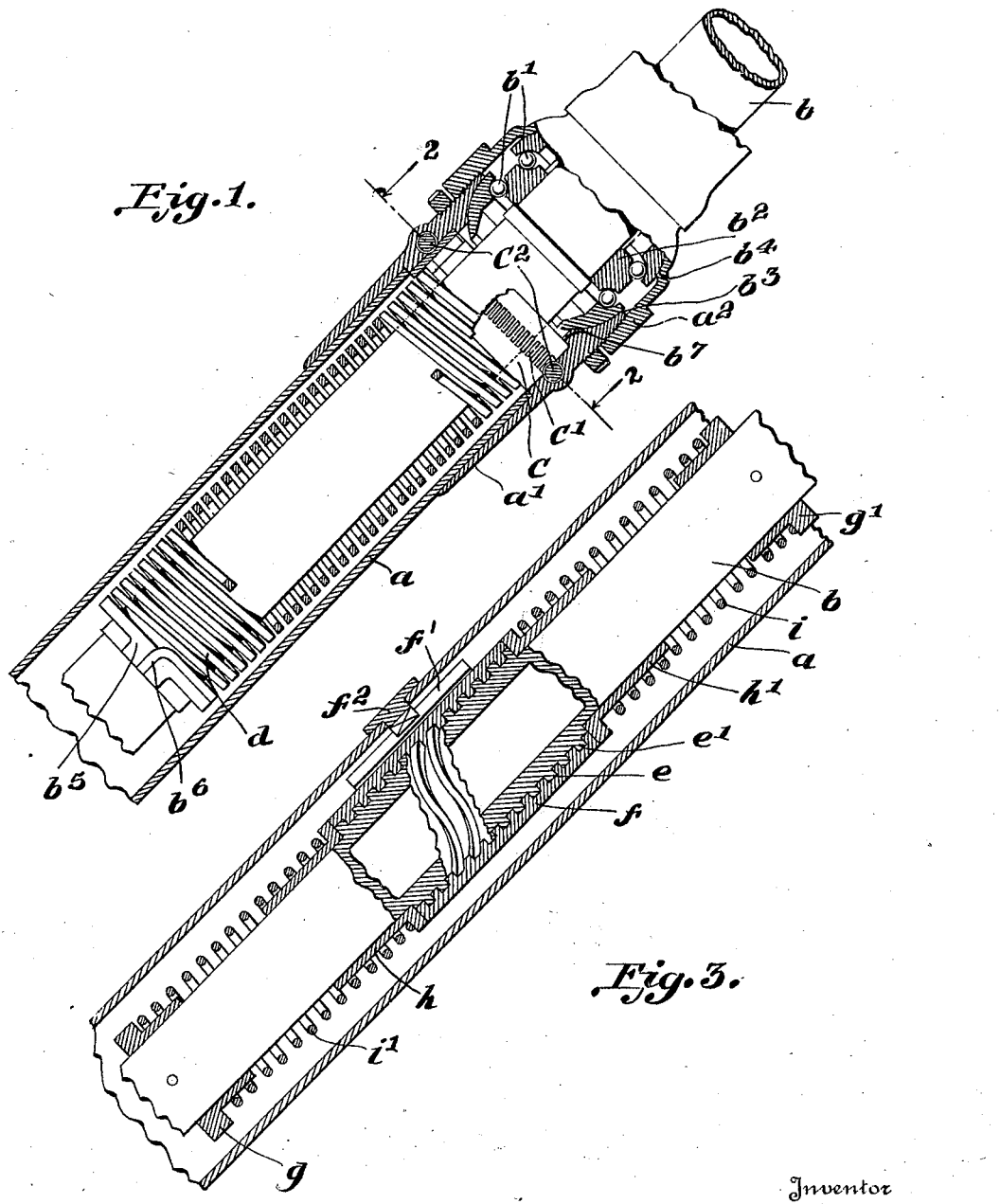

1,700,598

UNITED STATES PATENT OFFICE.

FREDERICK HENRY ROYCE, OF WEST WITTERING, NEAR CHICHESTER, ENGLAND, ASSIGNOR TO ROLLS ROYCE LIMITED, OF DERBY, ENGLAND.

STEERING MECHANISM FOR SELF-PROPELLED VEHICLES.

Application filed March 11, 1927, Serial No. 174,618, and in Great Britain March 13, 1926.

This invention has reference to steering mechanism for self propelled road vehicles.

In such mechanism it is common to arrange a rotating shaft which the driver actuates and which is geared to the front base wheels, and most commonly the shaft is provided with a worm which engages a member operably connected to a lever which controls the angular relationship of the front base wheels to the vehicles.

Obviously the mechanical advantage obtained in the mechanism varies largely in different constructions and various advantages and drawbacks appertain to constructions with comparatively great mechanical advantage, and to those with comparatively small mechanical advantage. In some constructions the mechanical advantage is so great that the steering is irreversible, meaning thereby that forces which under ordinary conditions may be applied to the wheels do not rotate the steering shaft, while in other constructions the mechanical advantage is sufficiently small to enable the steering shaft to be turned by a comparatively small force applied to the wheels.

In the latter form of construction an advantage to be secured lies in the fact that the front base wheels can be made self-centring, that is to say, they can be so mounted that if deflected when the vehicle is travelling, they will tend automatically to revert to the normal position parallel to the line of travel, and in so doing will necessarily rotate the shaft back to its normal position.

In some constructions it is necessary, including for example, where it is intended to adopt balloon tyres, to provide in the mechanism a substantial amount of mechanical advantage, which would incidentally eliminate wholly or partially the tendency of the wheels to self-centre, notwithstanding that they may be mounted to produce that action.

This invention applies mainly to cases of this last description, and has for its object to assist the tendency of the wheels to return to the normal position, by relieving the force urging that action wholly or partially from the necessity of overcoming the mechanical disadvantage, in order to rotate the shaft.

This invention consists in providing an elastic means which tends to return the shaft to its normal position.

In the accompanying drawings three forms of the invention are illustrated.

Fig. 1 shows a part-sectional elevation of the steering column showing one method of carrying out the invention, Fig. 2 is a transverse section of Fig. 1 on the line 2—2, Fig. 3 shows another method of carrying out the invention, Fig. 4 a third method, and Fig. 5 is a section of part of Fig. 4 on the line 5—5.

In Figs. 1 and 2, the apparatus illustrated is arranged to put a torsional stress in a spiral spring which urges the steering shaft when rotated back to normal position.

$a$ is the steering column or shaft case, $a^1$ being an extension thereof, and $a^2$ a nut securing the ball bearings hereinafter referred to, $b$ is the steering shaft to which the steering wheel is connected at one end, and which is adapted to be operably connected to the front base wheels at the other end, axially located in the column by the combined ball and thrust bearings $b^1$, the inner races being formed on the sleeve $b^2$ secured to the shaft, and the outer on the spherical members $b^3$ and $b^4$, supported in the part of the column $a^1$ and nut $a^2$. $b^5$ is a collar formed in the shaft with a slot $b^6$ for the purpose hereinafter appearing. $c$ is a sleeve normally fixed to the column but with adjustable means hereinafter described. $d$ is a coil spring encircling the shaft, one end being held in the slot $b^6$ and the other end secured to the sleeve $c$.

The sleeve $c$ butts against shoulder $b^7$ and around the centre of the periphery of the sleeve skew teeth $c^1$ are formed. $e^2$ are bolts through perforated bosses on the part $a^1$ of the shaft, having worms formed for a certain length at their centres, which engage skew teeth $c^1$. By rotating the bolts in opposite directions the sleeve $c$ can be rotated, and thereby the torsional stress in the spring $d$ adjusted. When the spring is adjusted the bolts are fixed by the nuts, but before tightening the nuts the slack can be taken out of the worms by simultaneously turning the two bolts to a slight degree in the same direction. In this arrangement the adjustment of the spring is such that when the steering wheels are straight there is no torsional stress in the spring.

In Fig. 3 the apparatus illustrated is arranged to put an axial stress in a coil spring, which urges the steering shaft back to normal position. $a$ is the column and $b$ the shaft. $e$ is a part of the shaft of larger diameter and having a thread $e^1$ formed thereon. $f$ is a nut with an internal thread engaging the thread $e^1$, $f^1$ is an elongated projection formed on the nut having an axial slot extending down its length, $f^2$ is a lug secured to the columns with a flattened part protruding into and slidable in the slot in the projection $f^1$, $g$ and $g^1$ are collars fixed on the shaft $b$. $h$ and $h^1$ are flanged bushes abutting against shoulders on the shaft formed by the part of larger diameter, and $i$ and $i^1$ are coil springs encircling the shaft and bushes respectively, reacting respectively between collar $g$ and bush $h$, and collar $g^1$ and bush $h^1$. In this arrangement any desired stress can be arranged in the springs when in normal position.

This construction functions as follows:—

When the shaft is turned the nut $f$ moves in one direction or the other axially, thereby compressing one of the springs, the other spring remaining inert, and with its flanged bush pressed against the shoulder on the shaft and the spring compressed subsequently urges the shaft to return to its normal position, the thread of the worm and nut being reversible. By making the spring comparatively long the resistance offered and the force exerted, is practically constant throughout the range of movement.

In Figures 4 and 5, the apparatus illustrated is arranged to put a torsional stress in a coil spring. $a$ is the column, and $b$ the shaft. $k$ (see Fig. 5) is a sleeve with internal axial serrations formed thereon, engaging corresponding serrations formed on the shaft, and with an external thread $k^1$. $l$ is a nut engaging the thread $k^1$ having formed thereon a boss $l^1$ with a central hole drilled therein, $l^2$ is a plug inserted through a hole in the column into the hole in the said boss, thus anchoring the nut to the column. $m$ and $m^1$ are collars fixed to the shaft. $n$ and $n^1$ are collars loose on the shaft but each located in one direction by the shoulders formed by the serrations on the shaft.

There is a small clearance between the collars $n$ and $n^1$ and the nut and sleeve, so as to relieve the nut of axial thrust from either of these springs in the functioning of the apparatus. $o$ and $o^1$ are coil springs secured respectively at one end to the collars $m$ and $m^1$ and at the other to the collars $n$ and $n^1$. Similar saw teeth or inclines are formed on the faces of the sleeve $k$ and the nut $l$, (the incline in the example illustrated in the drawings extends through the whole circumference of the sleeve and nut) and corresponding saw teeth or recesses are formed on the contiguous faces of the collars $n$ and $n^1$, with which the teeth or inclines on the sleeve and nut engage.

The inclination of the engaging threads on the sleeve and shaft is such that when the shaft has rotated one complete circle the saw teeth or inclines on the collars $n$ or $n^1$ whichever is moved, are free from the saw teeth or inclines on the nut. In this arrangement any desired stresss can be arranged in the springs when in normal position.

The apparatus functions as follows:—

Where the shaft is turned, the sleeve $k$ rotates and moves axially by reason of the engaging threads on the sleeve and nut. If for example, it is moving axially towards collar $n$ it will press collar $n$ towards collar $m$ and will at the same time rotate collar $n$, thus causing a torque stress in the spring $o$.

The other spring $o^1$ will remain inert, the sleeve $k$ having left the collar $n^1$ such collar of the shoulder on the shaft (the end of serrations) is restrained from axial movement, and by reason of its engagement with the saw-teeth on nut $l$ is restrained from rotational movement.

What I claim is:—

1. Steering mechanism for mechanically propelled vehicles comprising a fixed hollow column, and a steering shaft within the said column, characterized in that it further comprises, a portion of the shaft at a suitable distance from each end thereof formed of larger diameter than the main portion, axial serrations formed on such larger part, a sleeve on such larger part, internal axial serrations on such sleeve engaging the serrations on the shaft, a thread on the exterior of the sleeve, a nut engaging the thread on the said sleeve and anchored to the fixed hollow column, two collars fixed to the shaft, one on one side and the other on the other side of the said larger part and spaced apart therefrom, two collars loosely mounted on the said shaft, one on one side and the other on the other side, of the said larger part, and two coil springs oppositely wound encircling the said shaft, one reacting between, and with its ends respectively fixed to, the fixed and loose collars on one side of the said larger part, and the other reacting between and with its ends respectively fixed to the fixed and loose collars on the other side of the said larger part, two stops on the shaft respectively locating the loose collars in the direction of the nut and means whereby the sleeve on moving axially and rotatively in one direction engages one of the loose collars for rotation, and further winds the coil spring attached thereto, and on moving axially the sleeve rotatively in the other direction engages the other loose collar for rotation, and further winds the coil spring attached thereto.

2. Steering mechanism for mechanically propelled vehicles comprising a fixed hollow column, and a steering shaft within the said column, characterized in that it further comprises, a portion of the shaft at a suitable distance from each end thereof formed of larger diameter than the main portion, axial serrations formed on such larger part, a sleeve on such larger part, internal axial serrations on such sleeve engaging the serrations on the shaft, a thread on the exterior of the sleeve, a nut engaging the thread thereon, a boss on the outer side of the nut, a radial hole drilled into such boss, a hole registering with the said hole through the fixed column, a plug through the hole in the column and protruding into the hole in the said boss, two collars fixed to the shaft, respectively above and below the said larger part, and spaced apart therefrom, two collars loosely mounted on the said shaft respectively above and below said larger part, in diameter commensurate with that of the said nut, two coil springs oppositely wound encircling the said shaft, one reacting between, and with its ends respectively fixed to, the fixed and loose collar on one side of the larger part, and the other reacting between and with its ends respectively fixed to the fixed and loose collars on the other side of the larger part, two stops on the shaft respectively locating the loose collars in the direction of the nut, means whereby the sleeve, on moving axially and also rotatively in one direction engages one of the loose collars for rotation, and further winds the coil spring attached thereto, and on moving rotatably in the other directions engages the other loose collar for rotation, and further winds the coil spring attached thereto.

3. Steering mechanism for mechanically propelled vehicles comprising a fixed hollow column, and a steering shaft within the said column, characterized in that it further comprises, a portion of the shaft at a suitable distance from each end thereof formed of larger diameter than the main portion, axial serrations formed on such larger part, a sleeve on, and co-extensive except to a small distance at each end with, such larger part, axial serrations on the interior of such sleeve engaging the serrations on the shaft, a thread on the exterior of the sleeve, a nut, co-extensive in length with the said sleeve engaging the thread on the said sleeve and anchored to the hollow column, two collars fixed to the shaft, one on each side and the other on the other side of the said larger part, and spaced apart therefrom, two collars loosely mounted on the shaft one on one side and the other on the other side of, and each abutting against, the larger part and in diameter commensurate with that of the said nut, two coil springs oppositely wound encircling the said shaft, one reacting between, and with its ends respectively fixed to, the fixed and loose collars on one side of the larger part, and the other reacting between and with its ends respectively fixed to the fixed and loose collars on the other side of the said larger part, similar saw teeth on the end faces of the said sleeve and nut saw teeth on the faces of the loose collars presented to the sleeve and nut, engaging but normally with a small clearance those on the sleeve and nut, the said saw teeth all respectively inclined so that on the sleeve moving axially and rotatively in one direction, it engages and rotates one loose collar and further winds the coil spring attached thereto, and on moving axially and rotatively in the other directions engages and rotates the other loose collar and further winds the coil spring attached thereto.

In witness whereof I have signed this specification.

FREDERICK HENRY ROYCE.